March 23, 1965 V. S. HARRISON 3,174,282
ASYMMETRICAL JET NOZZLE NOISE SUPPRESSOR
Original Filed Jan. 27, 1958 3 Sheets-Sheet 1
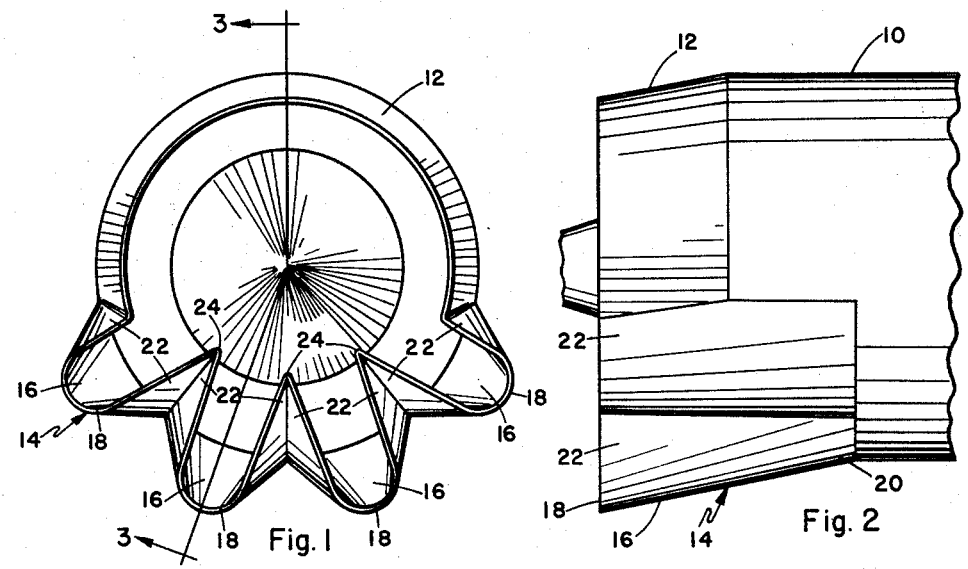
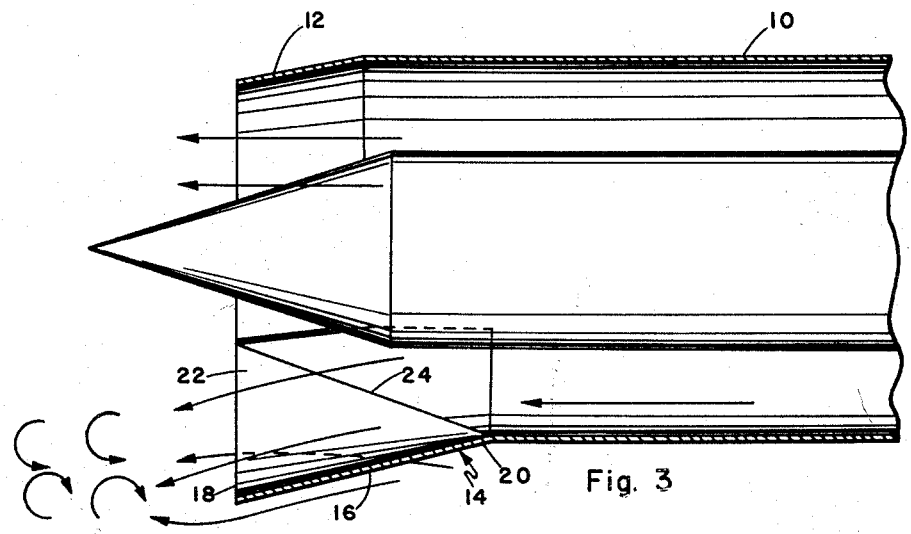
INVENTOR.
VERNE S. HARRISON
BY
Knox & Knox INVENTOR.
VERNE S. HARRISON
BY
Knox & Knox March 23, 1965   V. S. HARRISON   3,174,282
ASYMMETRICAL JET NOZZLE NOISE SUPPRESSOR
Original Filed Jan. 27, 1958   3 Sheets-Sheet 3

INVENTOR.
VERNE S. HARRISON
BY
*Knox & Knox*

United States Patent Office 3,174,282
Patented Mar. 23, 1965

3,174,282
ASYMMETRICAL JET NOZZLE NOISE
SUPPRESSOR
Verne S. Harrison, San Diego, Calif., assignor to The
Ryan Aeronautical Co., San Diego, Calif.
Continuation of abandoned application Ser. No. 711,345,
Jan. 27, 1958. This application Apr. 19, 1963, Ser. No.
280,178
10 Claims. (Cl. 60—35.6)

This application is a continuation of my copending application, Serial No. 711,345, filed January 27, 1958 now abandoned for an Asymmetrical Jet Nozzle Noise Suppressor.

The present invention relates generally to aircraft jet engines and more particularly to an asymmetrical jet nozzle noise suppressor.

Jet aircraft are extremely noisy and cause considerable discomfort to ground crews and other personnel as well as residents in the vicinity of an airport. The major portion of the noise is caused by the high velocity stream of hot jet exhaust gases shearing through the relatively still air behind the nozzle and producing high intensity, low frequency acoustical energy at the edge of the jet stream. The high frequency part of the noise is attenuated rapidly and is not objectionable except in a limited zone on close proximity to the aircraft. It has been found that the maximum low frequency noise energy originates several nozzle diameters downstream of the nozzle and that the noise radiates according to a definitely directional conical pattern. The noise may be reduced by initiating mixing of the cool surrounding air with the high velocity jet stream to lower the temperature and improve the velocity gradient of the gases and disperse the gases more quickly. Several devices have been proposed and tested for this purpose and these include baffles and specially shaped or fluted nozzles which induce mixing of the gases with surrounding air adjacent the nozzle. Such devices restrict the flow of jet gases and cause thrust losses of up to 10%, or more, with corresponding reduction of performance which is undesirable. Since the objectionable part of the noise is that radiated downwardly and to the sides, it is proposed to primarily suppress this portion of the jet exhaust with a minimum of restriction of performance. This is accomplished by means of an asymmetrical nozzle which induces maximum mixing of the jet exhaust at the lower boundary with the surrounding air at the lower portion of the nozzle only, so reducing the jet stream velocity and temperature at the lower boundary. At the same time, to avoid off-setting the jet stream thrust axis, the asymmetrical nozzle is so designed that the increased mass due to cooled exhaust and entrained ambient air compensates for the decreased jet stream velocity, thus maintaining a balanced mass-velocity product about the jet stream thrust axis.

The primary object of this invention, therefore, is to provide an asymmetrical jet nozzle designed to induce rapid mixing of the exhaust gases with the surrounding air at the lower portion of the nozzle and reduce the noise level below and to the sides of the nozzle.

Another object of this invention is to provide an asymmetrical nozzle which causes considerably less thrust loss than a corresponding 360 degree nozzle suppressor.

Another object of this invention is to provide an asymmetrical nozzle which reduces noise by reducing the velocity of a portion of the exhaust gases and prevents unbalancing the jet thrust axis by a proportionate compensating increase in the mass of said portion.

Yet another object of this invention is to provide an asymmetrical jet nozzle which may be added to many existing types of jet engines.

Finally, it is an object to provide an asymmetrical jet nozzle of the aforementioned character which is simple to make and install and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a rear elevation view of a simple asymmetrical fluted nozzle;

FIGURE 2 is a side elevation view thereof;

FIGURE 3 is a fragmentary sectional view taken on the line 3—3 of FIGURE 1;

FIGURE 5 is a side elevation view of the nozzle shown in FIGURE 4;

Similar characters of reference indicate similar or identical elements and portions throughout the specification and throughout the views of the drawings.

Figure 4:
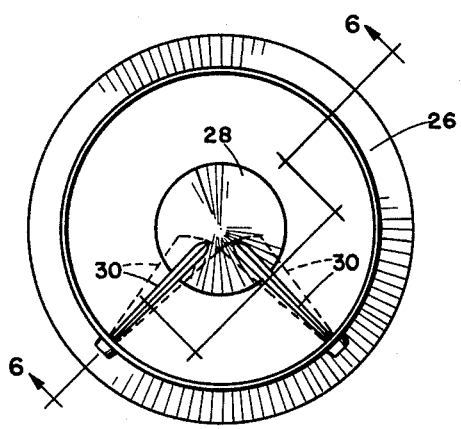
FIGURE 4 is a rear elevation view of modified nozzle using internal control vanes.

Referring now to FIGURES 1-3 of the drawings, the nozzle assembly is mounted on a jet engine tailpipe 10 having a convergent nozzle portion 12 around substantially the upper half of the circumference thereof. The lower portion of the nozzle constitutes the suppressor portion 14 and compirses a plurality of axially disposed, divergent corrugations or flutes 16 substantially U-shaped in cross section at their rear edges 18 and blending smoothly into the tailpipe at their forward ends 20. The flutes 16 are interconnected by means of substantially flat web portions 22 having common, longitudinal flow-splitting edges 24 which extend from the forward ends 20, inwardly across the diameter of the tailpipe 10, to points on an arc or a radius somewhat smaller than that of the tailpipe. Thus the web portions 22 substantially obstruct the lower portion of the tailpipe 10 and the exhaust gases are diverted by the flow-spliting edges 24 into the flutes 16. This obstruction of the tailpipe 10 is compensated for by the divergent flutes 16 and it will be evident, in FIGURE 1, that the total area of said flutes outside the diameter of the tailpipe is substantially constant while the surface along which he exhaust gases meet the outside air is greatly increased. The total length of the rear edges 18 of the flutes 16 and web portions 22 is several times the length of the corresponding circumference of the nozzle portion 12. The exhaust gases passing through the flutes 16 are directed outwardly, as indicated by the directional arrows in FIGURE 3, and mix with the external airflow along the entire length of the above mentioned rear edges so that the mixing is very complete. This mixing greatly reduces the temperature and velocity of the exhaust gases increases the mass, both by cooling and entrainment of ambient air; and, in so doing, reduces the rate of shear and pressure fluctuations or shock waves in the lower portion of the exhaust stream thus reducing generation and radiation of noise in a downward direction and at the same time, maintaining a balanced thrust axis.

Figure 5:
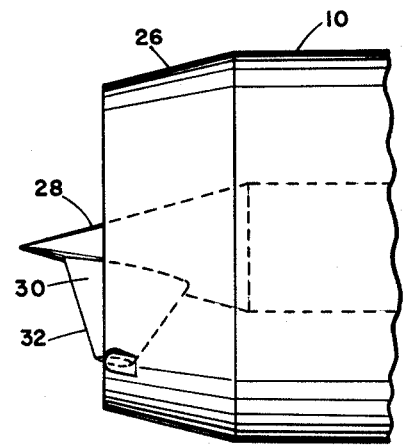
FIGURE 5 is a side elevation view of modified nozzle using internal control vanes.
Figure 6:
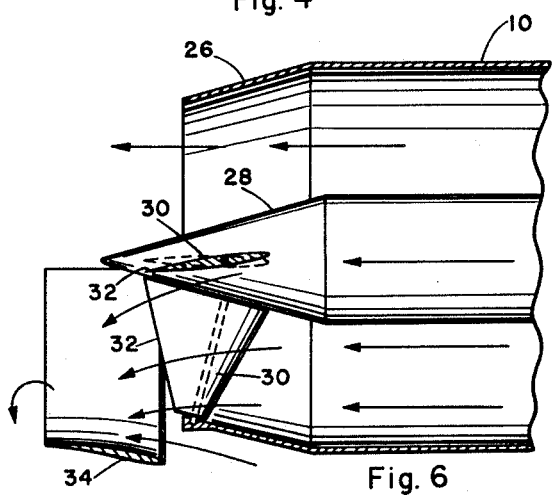
FIGURE 6 is a fragmentary sectional view taken on the line 6—6 of FIGURE 4, and showing an aspirator added.

A modified form of the structure is illustrated in FIGURES 4-6, in which the tailpipe 10 has a full annular convergent nozzle portion 26, while within the nozzle and coaxial therewith is a tailcone extension 28 projecting slightly beyond said nozzle. Mounted between the tailcone extension 28 and the inner wall of the nozzle portion 26 are two flow control vanes 30, which are pivotally mounted on axes extending radially of the nozzle axis. The control vanes 30 are of streamlined cross section so as to present a minimum of drag when disposed in line with the jet stream flow, this being the neutral or non-silencing position as shown in full line in FIGURE 4.

For noise suppression, the control vanes 30 are pivoted on their axes to bring their trailing edges 32 closer together and thus form a convergent passage through which the exhaust gases are funnelled, as shown in FIGURE 6. This restriction of the lower portion of the exhaust stream creates a vortex immediately behind the lower portion of the nozzle and causes the exhaust gases to mix more readily with the surrounding air, with resultant suppression of noise. The control vanes 30 are illustrated with an angular separation of substantially 90 degrees, but it should be understood that the included angle may be varied considerably according to requirements. Also any well known actuating mechanism may be used to operate the control vanes 30, the tailcone extension 28 providing a convenient, protective container for any such device.

Figure 7:
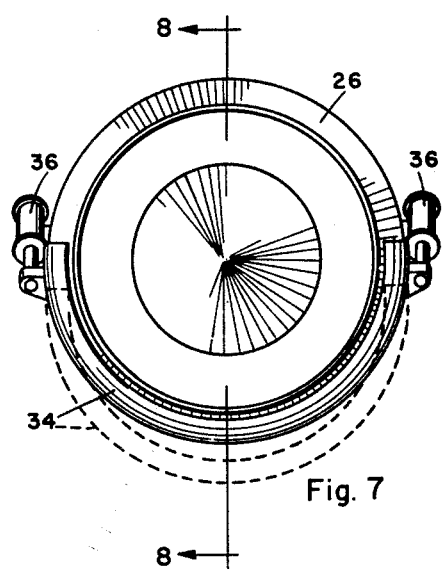
FIGURE 7 is a rear elevation view of another modified nozzle having an asymmetrical augmenter.
Figure 8:
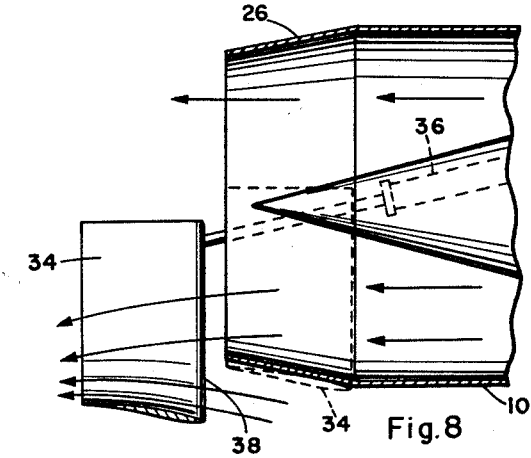
FIGURE 8 is a fragmentary sectional view taken on the line 8—8 of FIGURE 7.

Since the deflection of the lower jet stream by the vanes 30 may cause a slight pitching action of the aircraft due to offset thrust, the action is compensated by increasing the mass flow of the lower jet stream. This may be accomplished by means of an aspirator collar 34, which is positioned as shown in FIGURE 6, slightly downstream of the nozzle portion 26 and concentrically spaced therefrom, said aspirator collar inducing additional outside air to be drawn in and mixed with the exhaust gases to assist the cooling and sound suppression. Aspirator collar 34 may be retracted for streamlining as illustrated in FIGURES 7 and 8. The additional mass resulting from this aspirated air compensates for any thrust offset due to the deceleration of the lower portion of the jet stream and maintains balanced thrust along the original circular or symmetrical nozzle thrust axis.

The aspirator collar 34 may be used by iself as shown in more detail in FIGURES 7 and 8. In this embodiment, the aspirator collar 34 is applied to a tailpipe 10 having a convergent nozzle portion 26, said aspirator collar being streamlined or airfoil shaped in cross section and shaped to fit around the lower half of said nozzle portion in close proximity thereto. The specific cross sectional shape of the aspirator collar 34 is determined by well known aerodynamic formulae and may be varied to suit any particular nozzle configuration. In its retracted position, as indicated in full line in FIGURE 7 and in dash line in FIGURE 8, the aspirator collar 34 offers minimum resistance to the exhaust gases or the surrounding air. For noise suppression the aspirator collar 34 is extended rearwardly and slightly downwardly, by means of angularly disposed jacks 36, to a predetermined optimum position for diverting a portion of the surrounding air inwardly through the throat 38 thus formed with the nozzle portion 26. This augmented airflow mixes with the lower portion of the exhaust stream to decelerate and cool the gases and suppress the noise therefrom. The jacks 36 are merely indicative of actuating means for the aspirator collar 34 and any suitable mechanism may be substituted.

Figure 10:
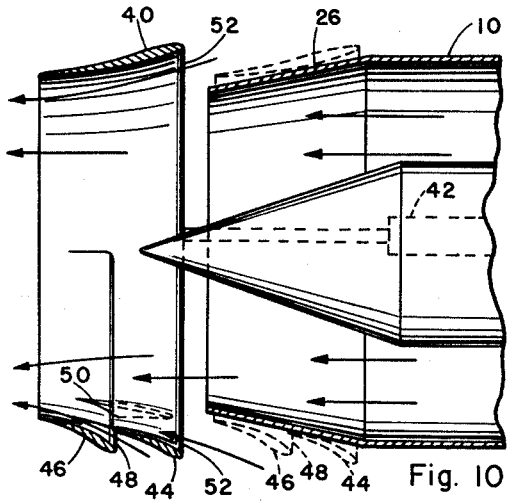
FIGURE 10 is a fragmentary sectional view taken on the line 10—10 of FIGURE 9.
Figure 9:
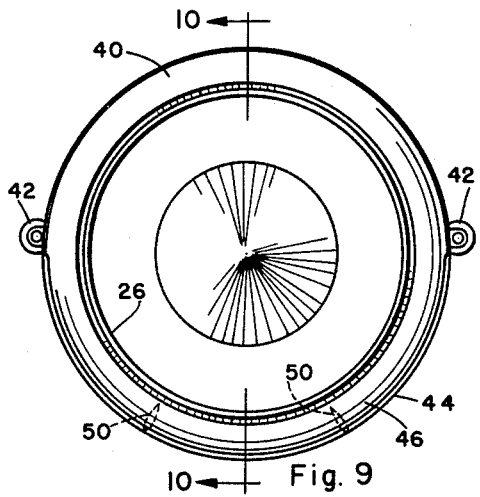
FIGURE 9 is a rear elevation view of a nozzle having an asymmetrical compound augmenter.

A modified form of this last described structure is illustrated in FIGURES 9 and 10, in which the tailpipe 10 and nozzle portion 26 are fitted with an annular aspirator ring 40 mounted to move axially and powered by jacks 42. The aspirator ring 40 has a compound lower portion comprising a forward aspirator collar 44 and a rear aspirator collar 46, defining between them a secondary throat 48. The collars 44 and 46 are braced by suitable support struts 50 in the secondary throat 48 interconnecting said collars. Thus the upper portion of the structure provides a single primary throat 52, while the lower portion provides both a primary throat 52 and the secondary throat 48, when the aspirator ring 40 is in the extended position as shown in full line in FIGURE 10. In the retracted position the aspirator ring 40 fits closely around the nozzle portion 26. Alternatively, the aspirator ring 40 may be fixed at its optimum position. This particular structure provides annular aspiration of surrounding air to obtain some degree of mixing around the entire nozzle, but the lower portion of the exhaust stream is further aspirated and cooled through the secondary throat 48 for added mass flow and directional noise suppression.

Figure 12:
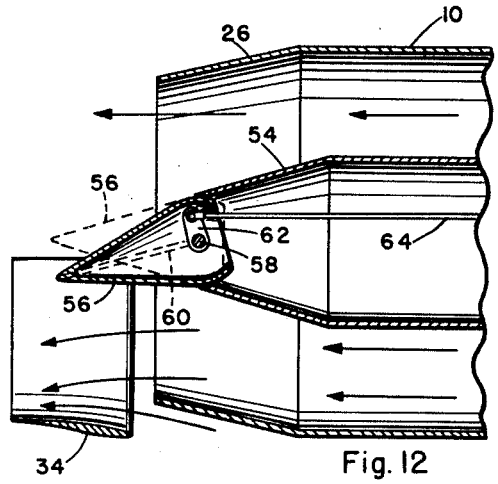
FIGURE 12 is a fragmentary sectional view taken on the line 12—12 of FIGURE 11, and showing an aspirator added.
Figure 11:
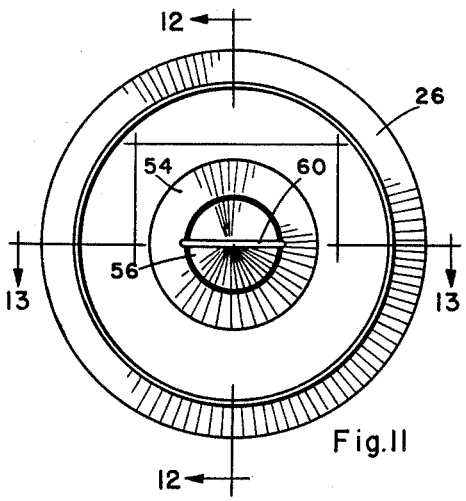
FIGURE 11 is a rear elevation view of still another modified nozzle having an internal deflector element.
Figure 13:
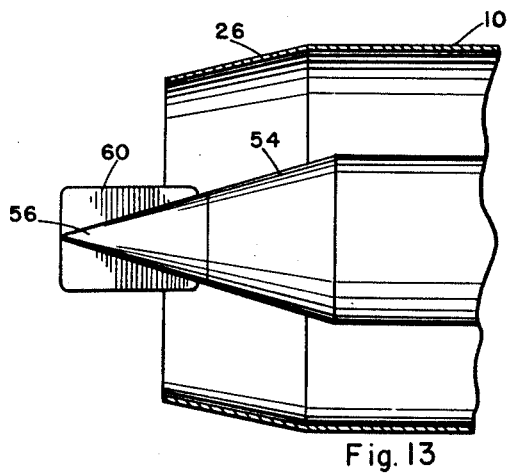
FIGURE 13 is fragmentary sectional view taken on the line 13—13 of FIGURE 11.

A fifth embodiment of the invention is illustrated in FIGURES 11-13, the tailpipe 10 and nozzle portion 26 being conventional and the assembly including a central, coaxial tailcone extension 54 projecting slightly beyond said nozzle portion. The rear portion of the tailcone extension 54 comprises a deflector tip 56 which is pivotally mounted on a substantially horizontal shaft 58 normal to the axis of the tailpipe 10, said deflector tip having fixed thereto a generally flat, horizontal vane 60 extending laterally on both sides thereof and substantially coplanar with the axis of the deflector tip. Fixed to the shaft 58 is an arm 62 to which is attached an actuating rod 64 so that, by shifting the actuating rod rearwardly, the deflector tip 56 is hinged downwardly. Other actuating devices may also be utilized, the simple mechanical structure shown being illustrative. In its depressed position, as shown in full line in FIGURE 12, the vane 60 causes the lower portion of the exhaust stream to be deflected downwardly to mix more readily with the surrounding air for the desired directional noise suppression. To avoid any offset thrust due to the deflection of the lower jet stream, an aspirator collar 34 may be added, as shown in FIGURE 12, to induce additional aspiration of the lower portion of the exhaust gases, in the manner described in connection with the structure shown in FIGURE 6. It should be noted that the aspirator ring 40 may also be used effectively with either of the structures shown in FIGURES 4-6 and FIGURES 11-13. Aspirator collar 34 may be retracted for streamlining as illustrated in FIGURES 7 and 8.

Although the various structures differ somewhat in appearance, all have the same purpose and function, namely, to create an asymmetrical flow of exhaust gases from the nozzle such that the lower portion of the exhaust stream is readily mixed with surrounding air to lower the temperature and improve the velocity gradient of the gases and, in so doing, to suppress a large portion of the noise caused by the gases. By treating only the lower portion of the exhaust stream, the objectionable noise is subdued with a minimum of power loss due to diverted flow, since the thrust differential of the upper and lower portions of the exhaust stream is generally balanced by the increased mass of the lower portion of the stream due to the induced air which is accelerated into the exhaust stream and thus compensates for the lowered velocity as compared to the remainder of the exhaust stream. Thus it will be readily apparent that thrust offset or directional control is not intended as a feature of the structures shown and is, in fact, avoided.

The devices illustrated each affect substantially one half of the nozzle or 180 degrees of the circumference. It should be understood, however, that the exact proportion of the nozzle affected is variable and may be considerably less or slightly more than a half, according to the requirements for a particular engine installation.

The devices such as the flutes and aspirators positioned at the lower portion of the high speed jet exhaust create a thick, turbulent barrier of disturbed hot and cold air. The fluid velocity gradient is more gradual due to this thick barrier layer, and layers of air of extremely high velocity difference are not created directly adjacent each other. This reduces noise generation in the immediate area.

However, this barrier not only reduces the noise at the lower portion of the jet exhaust, but it appears that it also prevents the objectionable noise from the top boundary of the jet exhaust from propagating smoothly downward. The barrier creates interference in the path of the sound wave fronts, and prevents efficient noise transmission. Thus, the structures of the present invention operate on the lower portion of the jet exhaust, but they also affect the downward noise transmission of the upper portion of the jet exhaust.

The operation of this invention will be clearly comprehended from a consideration of the foregoing description of the mechanical details thereof, taken in connection with the drawings and the above recited objects. It will be obvious that all said objects are amply achieved by this invention.

I claim:
1. In a jet aircraft, a horizontally disposed jet engine having
   an asymmetrical gas conducting exhaust nozzle including an upper portion, a lower portion, and gas flow controlling noise suppressor means operatively mounted on said lower portion only and arranged to induce increased mixing of the lower portion only of the exhaust gases with the surrounding air immediately downstream of the nozzle for maintaining balanced thrust while reducing the noise generated by and radiated from the exhaust gas jet.

2. In a jet aircraft, a horizontally disposed jet engine having
   an asymmetrical gas conducting nozzle including an upper portion, a lower portion and noise suppressor, flow deflecting elements operatively mounted on said lower portion only and arranged to induce asymmetrical, unilaterally increased mixing of the lower part only of the exhaust gases with the surrounding air immediately downstream of the nozzle for maintaining balanced thrust while reducing the noise generated by and radiated from said lower portion.

3. In a jet aircraft, a horizontally disposed jet engine having
   an asymmetrical gas conducting nozzle including an upper portion substantially hemicircular in transverse cross section and a lower portion, said lower portion only having noise suppressor means to induce asymmetrical, unilaterally increased mixing of the exhaust gases with the surrounding air immediately downstream of the nozzle for maintaining balanced thrust while reducing the noise generated by and radiated from said lower portion.

4. In a jet aircraft, a horizontally disposed jet engine having
   an asymmetrical gas conducting nozzle including an upper portion substantially hemicircular in transverse cross section, and a lower portion, said lower portion only having noise suppressor means to deflect the lower part only of the exhaust gas flow radially outwardly to induce asymmetrical, increased mixing of the exhaust gases with the surrounding air immediately downstream of the nozzle, and on the lower portion of the nozzle for maintaining balanced thrust while reducing the noise generated by and radiated from said lower portion.

5. In a jet aircraft, a horizontally disposed jet engine having
   an asymmetrical gas conducting nozzle including an upper portion and a lower noise suppressor portion; said lower portion only including a plurality of axially extending, divergent flutes dividing the lower portion of the exhaust gas stream into a plurality of divergent streams and inducing mixing of the streams with the surrounding air at the downstream end of the flutes for maintaining balanced thrust while reducing the noise generated by and radiated from said lower portion.

6. In a jet aircraft, a horizontally disposed jet engine having a gas conducting exhaust nozzle;
   a noise suppressor comprising a tailcone extension coaxial with said nozzle;
   a plurality of vanes pivotally mounted between said tailcone extension and a lower portion only of said nozzle for movement about axes extending substantially radially of the nozzle;
   and means for pivotally shifting said vanes to converge their downstream edges and thus creating turbulent flow in the lower portion of the exhaust gas stream and inducing mixing of the gases with the surrounding air immediately downstream of said nozzle for maintaining balanced thrust while reducing the noise generated by and radiated from said lower portion.

7. In a jet aircraft, a horizontally disposed jet engine having a gas conducting exhaust nozzle;
   a noise suppressor comprising an aspirator extending substantially coaxially with the lower portion only of said nozzle and spaced downstream of the nozzle to define a throat there between; said aspirator being shaped to divert a proportionately greater portion of the surrounding air through said throat into the lower portion of the exhaust gas stream for inducing mixing therewith in the immediate vicinity of the aspirator for maintaining balanced thrust while reducing the noise generated by and radiated from said lower portion.

8. In a jet aircraft, a horizontally disposed jet engine having a gas conducting exhaust nozzle;
   a noise suppressor comprising a generally semi-circular aspirator collar mounted substantially concentrically with the lower portion only of said nozzle;
   means for shifting said aspirator collar rearwardly of said nozzle to define a throat there between;
   said aspirator collar being shaped to divert a portion of the surrounding air through said throat into the lower portion of the exhaust gas stream to induce mixing therewith in the immediate vicinity of said aspirator for maintaining balanced thrust while reducing the noise generated by and radiated from said lower portion.

9. In a jet aircraft, a horizontally disposed jet engine having a gas conducting exhaust nozzle;
   a noise suppressor comprising an annular aspirator ring generally concentric with and spaced slightly downstream of said nozzle to define a primary annular throat therebetween;
   the lower portion only of said aspirator ring being divided and having at least one secondary throat substantially coextensive with said primary throat;
   whereby the air surrounding said nozzle is drawn through said primary throat to mix with the exhaust gas stream, and additional air is drawn through said secondary throat to mix with the lower portion of the exhaust gas stream for maintaining balanced thrust while reducing the noise generated by and radiated from said lower portion.

10. In a jet aircraft, a horizontally disposed jet engine having a gas conducting exhaust nozzle;
    a noise suppressor comprising a tailcone extension coaxial with said nozzle;

the rear portion of said extension being mounted for pivotal movement about a generally horizontal axis normal to the axis of said nozzle;

a vane fixed to said rear portion substantially coplanar with the axis thereof and extending laterally on both sides of the rear portion thereof;

means for pivotally shifting said rear portion and said vane angularly downwardly to deflect the lower portion only of the exhaust gas stream; and the lower portion only of said nozzle including means to entrain secondary air and mix it with the exhaust gas stream immediately down stream of said nozzle for maintaining balanced thrust while reducing the noise generated by and radiated from said exhaust gas stream.

References Cited by the Examiner

UNITED STATES PATENTS 2,812,636   11/57   Kadosch et al.

FOREIGN PATENTS 165,369   9/55   Australia.
653,544   5/51   Great Britain.

SAMUEL LEVINE, *Primary Examiner.*